US010203825B2

(12) United States Patent
Zhang et al.

(10) Patent No.: US 10,203,825 B2
(45) Date of Patent: Feb. 12, 2019

(54) ARRAY SUBSTRATE HAVING AN EMBEDDED TOUCH STRUCTURE AND DISPLAY PANEL

(71) Applicant: Wuhan China Star Optoelectronics Technology Co., Ltd., Wuhan, Hubei (CN)

(72) Inventors: Qipei Zhang, Guangdong (CN); Caiqin Chen, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 66 days.

(21) Appl. No.: 15/502,279

(22) PCT Filed: Dec. 28, 2016

(86) PCT No.: PCT/CN2016/112731
§ 371 (c)(1),
(2) Date: Feb. 7, 2017

(87) PCT Pub. No.: WO2018/119788
PCT Pub. Date: Jul. 5, 2018

(65) Prior Publication Data
US 2018/0217694 A1    Aug. 2, 2018

(51) Int. Cl.
*G06F 3/044* (2006.01)
*G02F 1/133* (2006.01)
(Continued)

(52) U.S. Cl.
CPC ............ *G06F 3/044* (2013.01); *G02F 1/1368* (2013.01); *G02F 1/13306* (2013.01);
(Continued)

(58) Field of Classification Search
None
See application file for complete search history.

(56) References Cited

U.S. PATENT DOCUMENTS

| 2015/0002448 | A1 | 1/2015 | Brunet |
| 2016/0349881 | A1 | 12/2016 | Fukushima |
| 2017/0010737 | A1* | 1/2017 | Liu ........................ G06F 3/0416 |

FOREIGN PATENT DOCUMENTS

| CN | 104516585 A | 4/2015 |
| CN | 104951162 A | 9/2015 |

(Continued)

*Primary Examiner* — Kenneth B Lee, Jr.
(74) *Attorney, Agent, or Firm* — Andrew C. Cheng

(57) ABSTRACT

An array substrate having an embedded touch structure is disclosed. A common electrode layer is divided in to multiple first and second electrodes. Multiple first and second electrode connecting lines disposed in a touch wiring layer are respectively connected the first and second electrodes to a driving integrated chip one by one. A common voltage signal line, a first switching signal line and a first and second switches are disposed in a layout area. In a display sequence, the first switching signal controls the first and second switches to turn on, so the first and second electrode connecting lines are respectively connected to the common voltage signal line. In a touch sequence, the first switching signal controls the first and second switches to turn off to disconnect the first and second electrode connecting lines and the common voltage signal line. A display panel having the array substrate is also disclosed.

16 Claims, 3 Drawing Sheets

(51) Int. Cl.
    *G02F 1/1333*     (2006.01)
    *G02F 1/1335*     (2006.01)
    *G02F 1/1343*     (2006.01)
    *G02F 1/1368*     (2006.01)
    *G06F 3/041*     (2006.01)

(52) U.S. Cl.
CPC ...... *G02F 1/13338* (2013.01); *G02F 1/13439* (2013.01); *G02F 1/133514* (2013.01); *G02F 1/134309* (2013.01); *G06F 3/0412* (2013.01); *G02F 2201/121* (2013.01); *G06F 2203/04111* (2013.01)

(56) References Cited

FOREIGN PATENT DOCUMENTS

| | | |
|---|---|---|
| CN | 106055156 A | 10/2016 |
| CN | 106020556 A | 12/2016 |
| CN | 106201057 A | 12/2016 |
| DE | 102014212094 A1 | 12/2014 |

\* cited by examiner

ARRAY SUBSTRATE HAVING AN EMBEDDED TOUCH STRUCTURE AND DISPLAY PANEL

FIELD OF THE INVENTION

The present invention relates to a touch technology field, and more particular an array substrate having an embedded touch structure and a display panel.

BACKGROUND OF THE INVENTION

A touch display screen used as an input medium is a simplest and most convenient human-computer interaction way, so the touch display screen is increasingly used to a variety of electronic devices. Based on different working principles and a transmission of information media, the touch screen may be classified into four types: an infrared ray touch screen, a capacitive touch screen, a resistive touch screen and a surface acoustic wave touch screen. Since the capacitive touch screen has many advantages, such as a long-term life, a high transmittance and a multi-touch function etc., the capacitive touch screen becomes a mainstream technique of the touch screen. The capacitive touch screen includes a surface capacitive type and a projected capacitive type. The projected capacitive type may be classified into a self-capacitive type and a mutual-capacitive type, wherein the self-capacitive type has a greater touch sensing accuracy and a greater signal-noise-ratio, so the major panel manufacturers favor the self-capacitive type accordingly.

The mutual-capacitive touch screen includes driving electrodes and sensing electrodes formed on a glasses surface. An intersection between the driving electrode and the sensing electrode forms a coupled capacitance, so the driving and sensing electrodes are used as two electrodes of the coupled capacitance. When a finger touches the capacitive screen, a coupling between the two electrodes near a touched point is influenced and the coupled capacitance between the two electrodes is changed accordingly. To detect the mutual-capacitance, the driving electrode outputs an exciting signal and the sensing electrodes receive signals one by one, so the capacitances of the intersections between all of the driving and sensing electrodes can be obtained. That is, a two-dimensional capacitance of the entire touch screen is obtained. According to a variation data of the two-dimensional capacitance of the touch screen, a coordinates of each touch point can be calculated. In an in-cell mutual-capacitive touch screen, the driving electrodes and sensing electrodes in the touch screen structure and metal connecting lines are usually and directly disposed on an array substrate. For example, a common electrode on the array substrate is divided into the driving and sensing electrodes, which extend along directions perpendicular to each other and are isolated from each other. The driving and sensing electrodes are connected to an external driving chip through electrode connecting lines. The diving and sensing electrodes are also used as the common electrode. Therefore, in a display time of one frame, the driving and sensing electrodes time-sharing transmit a common voltage ($V_{com}$) and a touch signal. These signals are provides by the driving chip and the driving chip is a touch and display driver integration (TDDI).

Since the driving and sensing electrodes are formed by dividing the common electrode, they are formed on the same layer structure. In general, the driving electrodes are arranged in laterally-extended strip-shaped structures. The sensing electrode includes multiple sub-electrodes, which are sequentially connected in series by the electrode connecting lines to form a longitudinally-extended electrode structure extending. Therefore, a metal wiring layer including the driving electrode connecting lines and sensing electrode connecting lines is required to be disposed above the common electrode layer relatively. The common voltage and the touch signal transmitted by all of the driving and sensing electrodes are input by the driving chip through the electrode connecting lines. In a display sequence, wiring paths of the driving and sensing electrode connecting lines are different, so a difference of the wiring resistances is larger to result in a larger potential difference between the common voltage of the driving electrode and the common voltage of the sensing electrode. A normal display of a display device is affected accordingly.

SUMMARY OF THE INVENTION

Because of the shortcomings of the prior art, the present invention provides an array substrate having an embedded touch structure. When the embedded touch structure uses driving and sensing electrodes as a common electrode, a common voltage of the driving electrode and a common voltage of the sensing electrode are more even to increase a display quality.

To achieve the above-mentioned goal, the present invention uses a following technique:

An array substrate having an embedded touch structure has a common electrode layer and a touch wiring layer. The common electrode layer is divided into multiple first electrodes and multiple second electrodes extending along directions perpendicular to each other and are isolated from each other. The touch wiring layer is disposed with multiple first electrode connecting lines and multiple second electrode connecting lines. The array substrate has an effective display area and a first layout area, a second layout area, a third layout and a fourth layout area surrounded outside the effective display area, wherein the first layout area has a driving integrated chip. The multiple first electrode connecting lines are extended from the first layout area to an area adjacent to the second layout area and the four layout area, and connect the multiple first electrodes to the driving integrated chip one by one. The multiple second electrode connecting lines are extended from the first layout area, across the effective display area and toward the corresponding third layout area and connect the multiple second electrodes to the driving integrated chip one by one. The multiple first electrodes and the multiple second electrodes time-sharing transmit a common voltage signal and a touch signal. A common voltage signal line and a first switching signal line are disposed in the second layout area, the third layout area and the fourth layout area. In the second layout area and the fourth layout area, each of the first electrode connecting lines is connected to the common voltage signal line through a first switch. In the third layout area, each of the second electrode connecting lines is connected to the common voltage signal line through a second switch. In a display sequence, the first switching signal line controls the first switch and the second switch to turn on to respectively connect the first electrode connecting line and the second electrode connecting line to the common voltage signal line. In a touch sequence, the first switching signal line controls the first switch and the second switch to turn off to disconnect the first electrode connecting line and the second electrode connecting line and the common voltage signal line.

Furthermore, the first switch and the second switch are thin film transistors, a gate of the first switch and a gate of the second switch are respectively connected to the first switching signal line, a source of the first switch and a source of the second switch are respectively connected to the common voltage signal line, a drain of the first switch is connected to the first electrode connecting line and a drain of the second switch is connected to the second electrode connecting line.

Furthermore, each of the first electrodes is elongated to a strip shape in the effective area and each of the second electrodes has multiple second sub-electrodes. The second electrode connecting line corresponding to each of the second electrode sequentially connects the second sub-electrodes to each other.

Furthermore, the touch wiring layer is located above the data wiring layer relatively and an isolation layer is disposed between the touch wiring layer and the common electrode layer. The first electrode connecting line and the second electrode connecting line are respectively connected to the corresponding first electrode and the corresponding second electrode through the vias formed in the isolation layer.

Furthermore, the array substrate further has a data wiring layer having multiple parallelly-arranged data lines. An extending direction of the second electrode is the same as that of the data line. Each of the second electrodes covers across the at least one data line. The third layout area at least has a second switching signal line and multiple third switches. Each of the data line is connected to the second electrode connecting line corresponding to the second electrode covering the data line through one of the third switches. In the touch sequence, the second switching signal line controls the third switch to turn on to connect the data line to the second electrode connecting line. In the display sequence, the second switching signal line controls the third switch to turn off to disconnect the data line and the second electrode connecting line.

Furthermore, the second switching signal line and the multiple third switches are further disposed in the first layout area. In the first layout area, each of the data lines is connected to the second electrode connecting line corresponding to the second electrode covering the data line through one of the third switches.

Furthermore, in the first layout area, each of the first electrode connecting lines is connected to one of the data lines through one of the third switches.

Furthermore, the third switch is a thin film transistor; a gate of the third switch is connected to the second switching signal line; a source is connected to the data line; and a drain is connected to the corresponding first electrode connecting line or the corresponding second electrode connecting line.

Furthermore, the data wiring layer is located below the common electrode layer relatively and an isolation layer is disposed between the data wiring layer and the common electrode layer.

The present invention also provides a display panel, having two oppositely-disposed array substrate and color film substrate and a liquid crystal layer filled between the array substrate and the color film substrate, wherein the array substrate is the above-described array substrate having the embedded touch structure.

In the array substrate having the embedded touch structure and the display panel provided by the embodiments of the present invention, the common voltage signal line is added in the wiring area. When the driving electrodes and sensing electrodes are used as the common electrode and the common voltage signal line inputs the common voltage to the driving and sensing electrodes, the common voltages of the driving and sensing electrodes are evener to increase the display quality.

DETAILED DESCRIPTION OF THE PREFERRED EMBODIMENTS

Figure 1:
FIG. 1 is a structural schematic view of a first embodiment of an array substrate having a touch screen structure.

In order to make the objects, technical solutions and advantages of the present invention becoming clearer, the embodiments of the present invention are described in detail with reference to the accompanying drawings. Examples of these preferred embodiments are illustrated in the drawings. The embodiments of the present invention shown in the drawings and described in accordance with the accompanying drawings are merely exemplary and the invention is not limited to these embodiments.

It should be noted here, to avoid blurring the present invention by unnecessary details, the drawings show only structures and/or processing steps which are closely related to the solution according to the present invention, but other details not related to the present invention are omitted.

Embodiment 1

Figure 2:
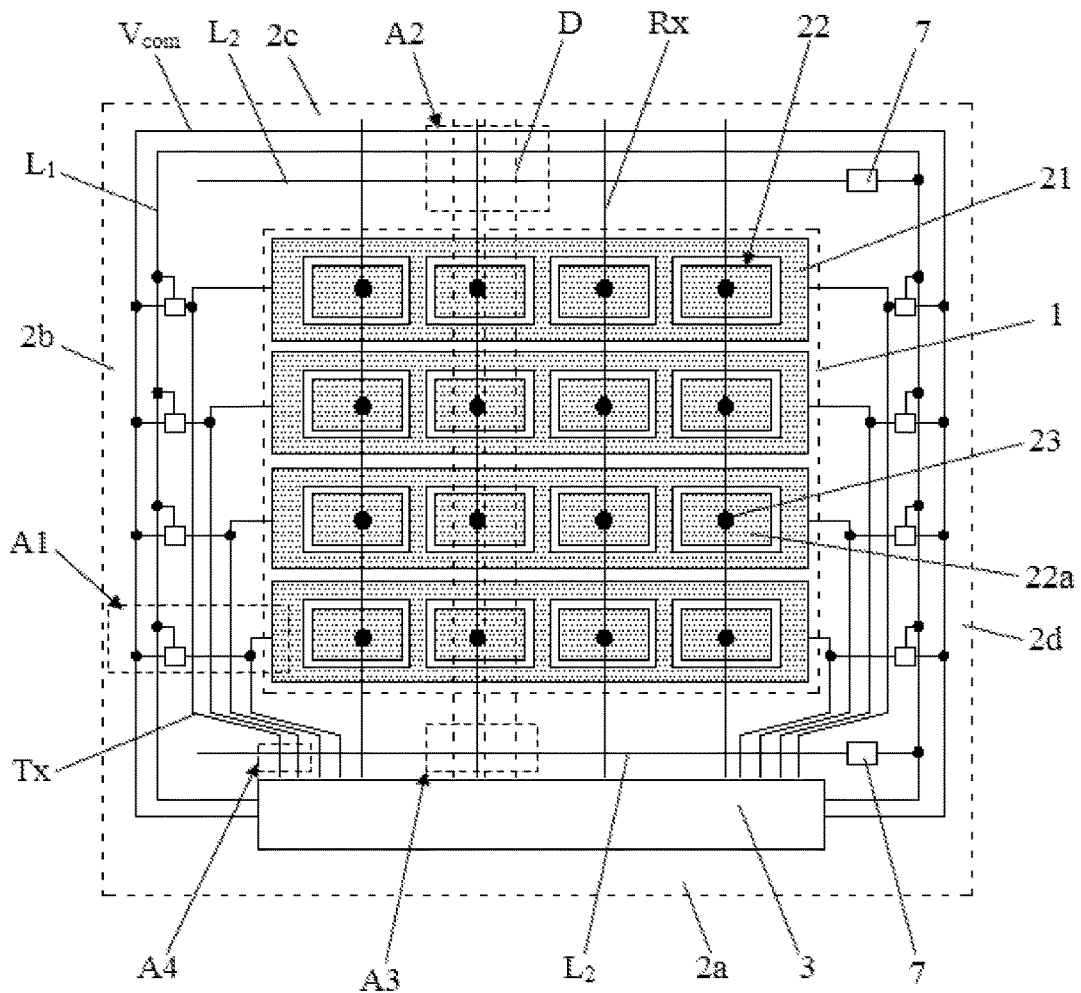
FIG. 2 is a schematic plane view of the array substrate in FIG. 1.

The present embodiment provides an array substrate having an embedded touch structure. As shown in FIGS. 1 and 2, the array substrate includes a data wiring layer 10, a common electrode layer 20 and a touch wiring layer 30, which are sequentially disposed on a glass substrate 00. A first isolation layer 40 is disposed between the data structure layer 10 and the common electrode layer 20 and a second isolation layer 50 is disposed between the common electrode layer 20 and the touch wiring layer 30.

As shown in FIG. 2, the data wiring layer 10 has multiple parallelly-arranged data lines D connected to pixel units. A part of multiple data lines D is exemplarily shown in FIG. 2 and indicated by a dotted line below the common electrode layer 20. The common electrode layer 20 is divided into multiple first electrodes 21 and multiple second electrodes 22, which extend along directions perpendicular to each other and are isolated from each other. An extending direction of the second electrode 22 is the same as that of the data line D and each of the second electrodes 22 correspondingly covers with at least one data line D. The touch wiring layer 30 includes multiple first electrode connecting lines Tx and multiple second electrode connecting lines Rx. The array substrate includes an effective display area 1 and a first layout area 2a, a second layout area 2b, a third layout area 2c and fourth layout area 2d, which are disposed around outsides of the effective display area. The first layout area 2a has a driving integrated chip 3.

As shown in FIG. 2, the multiple first electrode connecting lines Tx are extended from the first layout area 2a to an area adjacent to the second layout area 2b and the four layout area 2d, and connect multiple first electrodes 21 to the driving integrated chip 3 one by one. The multiple second electrode connecting lines Rx are extended from the first layout area 2a, across the effective display area 1 and toward the corresponding third layout area 2c, and connect multiple second electrodes 22 to the driving integrated chip 3 one by one. In the present embodiment, each of the first electrodes 21 is elongated to a strip shape in the effective area 1. Each of the second electrodes 22 includes multiple second sub-electrodes 22a. The second electrode connecting lines Rx corresponding to each of the second electrode 22a sequentially connect the second sub-electrodes to each other. In particular, the second electrode connecting lines Rx are connected to the second sub-electrodes 22a through multiple vias 23.

The first electrode 21 is disposed as a driving electrode and the second electrode 22 is disposed as a sensing electrode. In addition, the first electrode 11 may be disposed as the sensing electrode and the second electrode 22 may be disposed as the driving electrode. The multiple first electrodes 21 and the multiple second electrodes 22 are also used as a common electrode. Therefore, in a display time of one frame, the driving integrated chip 3 drives the multiple first electrode 21 and multiple second electrodes 22 to time-sharing transmit a common voltage and a touch signal. In FIG. 2, the first isolation layer 40 and the second isolation layer 50 are not shown but a 4 columns×4 rows of the first electrodes 21 and the second electrodes 22 is exemplarily shown. In another embodiment, it is can be divided into greater number of the first electrodes and the second electrodes may be more.

The driving integrated chip 3 is a touch and display driver integration (TDDI), the driving integrated chip 3 provides a display driving signal in a display sequence and a touch driving signal in a touch sequence.

In the present embodiment, as shown in FIG. 2, a common voltage signal line $V_{com}$ and a first switching signal line $L_1$ are disposed in the second layout area 2b, the third layout area 2c and the fourth layout area 2d. In the second layout area 2b and the fourth layout areas 2d, each electrode connecting line Tx is connected to the common voltage signal line $V_{com}$ through a first switch. In the third layout area 2c, each second electrode connecting line Rx is connected to the common voltage signal $V_{com}$ through a second switch.

Figure 3:
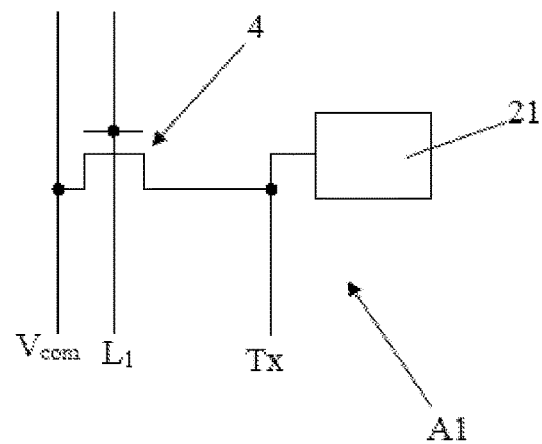
FIG. 3 is a schematic view of a connecting structure in part A1 of FIG. 2.
Figure 4:
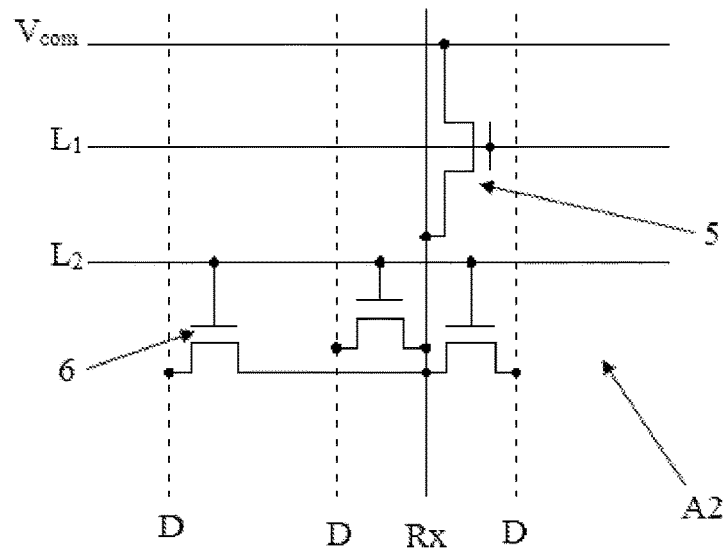
FIG. 4 is a schematic view of a connecting structure in part A2 of FIG. 2.

In particular, as shown in FIG. 3, the first switch 4 is a thin film transistor. A gate of the first switch 4 is connected to the first switching signal line $L_1$, a source is connected to the common voltage signal line $V_{com}$, and a drain is connected to the first electrode connecting line Tx. As shown in FIG. 4, the second switch 5 is a thin film transistor. A gate of the second switch 5 is connected to the first switching signal line $L_1$, a source is connected to the common voltage signal line $V_{com}$, and a drain is connected to the second electrode connecting line Rx. The common voltage signal line $V_{com}$ and the first switching signal line $L_1$ are respectively connected to the driving integrated chip 3, and the driving integrated chip 3 inputs the common voltage to the common voltage signal line $V_{com}$. The driving integrated chip 3 inputs a turn-on or turn-off controlling signal of the first switch 4 and the second switch 5 to the first switching signal line $L_1$.

As the array substrate is provided by the above embodiment, in the display sequence, the first switching signal line $L_1$ controls the first switch 4 and the second switch 5 to turn on to respectively connect the first electrode connecting line Tx and the second electrode connecting line Rx to the common voltage signal line $V_{com}$. In the touch sequence, the first switching signal line $L_1$ controls the first switch 4 and the second switch 5 to turn off to disconnect the first electrode connecting line Tx and the second electrode connecting line Rx to the common voltage signal Line $V_{com}$. Therefore, in the display sequence, the common voltage signal line $V_{com}$ inputs the common voltage signal to the first electrode 21 and second electrodes 22 from four sides. That is, the first electrode 21 receives the common voltage signal from two opposite sides and the second electrode 22 also receives the common voltage signal from two opposite sides, so the common voltages of the first electrode 21 and the second electrode 22 are evener to increase a display quality. In the touch sequence, the first electrode connecting line Tx and the second electrode connecting line Rx are disconnected to the common voltage signal line $V_{com}$, so the common voltage signal line $V_{com}$ does not affect the transmission of the touch signal.

In a preferred technique solution, in the second layout area 2b and the fourth layout areas 2d, a connecting node between the drain of the first switch 4 and the first electrode connecting line Tx should be as close as possible to a connecting node between first electrode connecting line Tx and the first electrode 21. Accordingly, a loss difference of the common voltages of the connecting lines can be minimized.

Furthermore, in the present embodiment, as shown in FIGS. 2 and 4, the third layout area 2c has a second switching signal line $L_2$ and multiple third switches 6. Each of the data line D is connected to the second electrode connecting line Rx corresponding to the second electrode 22 covering the data line D through one of the third switch 6. In particular, the third switch 6 is a thin film transistor. A gate of the third switch 6 is connected to the second switching signal line $L_2$, a source is connected to the data line D and a drain is connected to the corresponding second electrode connecting line Rx. In the touch sequence, the second switching signal line $L_2$ controls the third switch 6 to turn on to connect the data line D to the second electrode connecting line Rx. In the display sequence, the second switching signal line $L_2$ controls the third switch 6 to turn off to disconnect the data line D and the second electrode connecting line Rx.

Since the touch wiring layer 30 is located above the data wiring layer 10 relatively and the isolation layer is disposed therebetween, in particular, the coupled capacitance is formed between the second electrode connecting line Rx of the touch wiring layer 30 in the effective display area 1 and the data line D, an accuracy and a sensitivity of touch operation are decreased. Accordingly, in the present embodiment, in the touch sequence, the data line D is connected to the second electrode connecting line Rx by controlling of the second switching signal line $L_2$ and the third switch 6 to greatly decrease the coupled capacitance between the second electrode connecting line Rx and the data line D, so the accuracy and sensitivity of the touch operation is increased. In the display sequence, the data line D is disconnected to the second electrode connecting line Rx, so a driving of a display signal is not affected.

The second switching signal line $L_2$ may be connected to the driving integrated chip 3 and the driving integrated chip 3 provides the controlling signal. In the present embodiment, as described previously, the first switching signal line $L_1$ controls the first switch 4 and the second switch 5 to turn on in the display sequence, but controls the first switch 4 and the second switch 5 to turn off in the touch sequence. On the contrary, the second switching signal line $L_2$ controls the third switch 6 to turn off in the display sequence, but controls the third switch 6 to turn on in the touch sequence. It can be seen that the controlling signals of the first switching signal line $L_1$ and the second switching signal line $L_2$ are inverse to each other. Therefore, as shown in FIG. 2, in the present embodiment, the second switching signal line $L_2$ is connected to the first switching signal line $L_1$ through an inverter 7.

Figure 5:
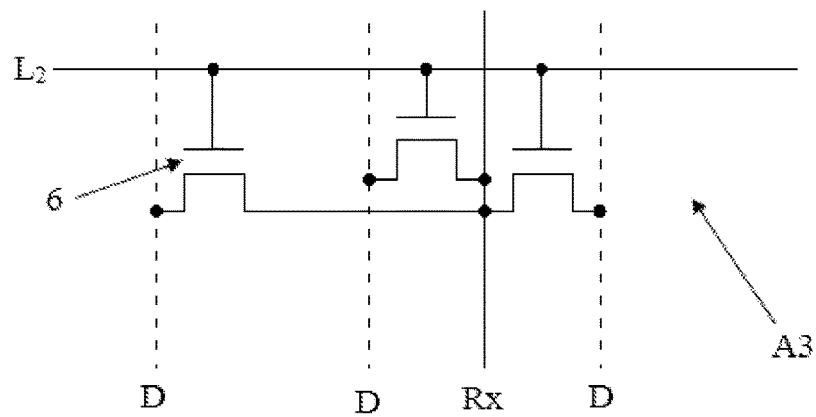
FIG. 5 is a schematic view of a connecting structure in part A3 of FIG. 2.

Furthermore, in the present embodiment, as shown in FIGS. 2 and 5, the second switching signal line L2 and the third switch 6 are disposed in the first layout area 2a. in the first layout area 2a, each of the data lines D is connected to the second electrode connecting line Rx corresponding to the second electrode 22 covering the data line D through one of the third switches 6. In particular, the gate of the third switch 6 is connected to the second switching signal line $L_2$, the source is connected to the data line D and the drain is connected to the corresponding second electrode connecting line Rx. Accordingly, in the touch sequence, the two opposite side of the effective display area 1, the data line D and second electrode connecting line Rx are connected together at the same time. Under a condition that the coupled capacitance is reduced, the coupled capacitance between the second electrode connecting line Rx and the data line D can be made uniform in each region and the stability of the touch operation is increased.

Figure 6:
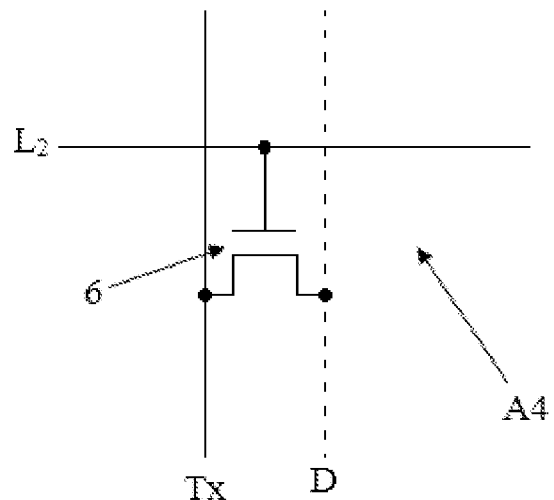
FIG. 6 is a schematic view of a connecting structure in part A4 of FIG. 2.

Furthermore, in the present embodiment, as shown in FIGS. 2 and 6, in the first layout area 2a, each of the first electrode connecting lines Tx is connected to one of the data lines D through one of the third switches 6. In particular, the gate of the third switch 6 is connected to the second switching signal line $L_2$, the source is connected to the data line D and the drain is connected to the corresponding first electrode connecting line Tx. As described previously, the first electrode connecting line Tx is mainly disposed in the second layout area 2b and the fourth layout areas 2d and the coupled capacitance between the first electrode connecting line Tx and data line D is smaller. However, to avoid the influence of the coupled capacitances, the first electrode connecting line Tx may be connected to the data line D near the second layout area 2b and the fourth layout area 2d.

Embodiment 2

Figure 7:
FIG. 7 is a structural schematic view of a second embodiment of a display panel structure.

The present embodiment firstly provides a display panel, as shown in FIG. 7. The display panel is a liquid crystal display panel including two oppositely-disposed array substrate 100 and color film substrate 200. A liquid crystal layer 300 is filled between the array substrate 100 and color film substrate 200, wherein the array substrate 100 is the array substrate having the embedded touch structure provided by the above embodiment 1.

Figure 8:
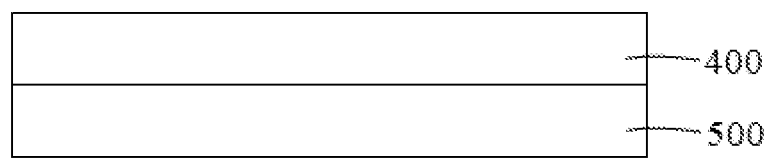
FIG. 8 is a structural schematic view of the second embodiment of a display panel device.

Another aspect of the present embodiment is a display device, as shown in FIG. 8. The display device includes a display panel 400 and a backlight module 500. The display panel 400 and the backlight module 500 are disposed oppositely. The backlight module 500 provides a display light source to the display panel 400 to display an image, wherein the display panel 400 uses the liquid crystal display panel provided by the present embodiment.

Based on the foregoing description, in the array substrate having the embedded touch structure and the display panel provided by the embodiments of the present invention, the common voltage signal line are added in the wiring area. When the driving electrodes and sensing electrodes are used as the common electrode and the common voltage signal line inputs the common voltage to the driving and sensing electrodes, the common voltages of the driving and sensing electrodes are evener to increase the display quality. Furthermore, in the touch sequence, the touch wiring is connected to the data line to decrease the coupled capacitance between the touch wiring and the data line to increase the accuracy and a sensitivity of the touch operation.

It should be noted that in this context, the relational terms such as first and second are used merely to distinguish one entity or operation from another entity or operation without necessarily requiring or implying that any such actual relationship or order is existed between such entities or operations. The terms "include", "comprise" or another variant term, which is intended to encompass a non-exclusive inclusion, so that a process, method, article, or equipment including a set of elements includes not only those elements but also those that are not explicitly listed, or further includes elements inherent to such process, method, article, or equipment. In the absence of any further limitation, the elements defined by a sentence "comprising one . . . " do not preclude the presence of additional identical elements in a process, method, article, or equipment that includes the elements.

The above embodiments of the present disclosure are preferred embodiments. It should be noted that people who skilled in the filed make improvements and polishes within the principles of the present disclosure and these improvements and polishes should be covered in the scope of the present disclosure.

What is claimed is:

1. An array substrate having an embedded touch structure, comprising a common electrode layer and a touch wiring layer, wherein the common electrode layer is divided into multiple first electrodes and multiple second electrodes extending along directions perpendicular to each other and are isolated from each other; the touch wiring layer is disposed with multiple first electrode connecting lines and multiple second electrode connecting lines; and the array substrate comprises an effective display area and a first layout area, a second layout area, a third layout area and a fourth layout area surrounded outside the effective display area, wherein the first layout area has a driving integrated chip; the multiple first electrode connecting lines are extended from the first layout area to an area adjacent to the second layout area and the fourth layout area and connect the multiple first electrodes to the driving integrated chip one by one; the multiple second electrode connecting lines are extended from the first layout area, across the effective display area and toward the corresponding third layout area and connect the multiple second electrodes to the driving integrated chip one by one; and the multiple first electrodes and the multiple second electrodes time-sharing transmit a common voltage signal and a touch signal; wherein a common voltage signal line and a first switching signal line are disposed in the second layout area, the third layout area and the fourth layout area, wherein in the second layout area and the fourth layout area, each of the first electrode connecting lines is connected to the common voltage signal line through a first switch; and in the third layout area, each of the second electrode connecting lines is connected to the common voltage signal line through a second switch;

in a display sequence, the first switching signal line controls the first switch and the second switch to turn on to respectively connect the first electrode connecting line and the second electrode connecting line to the common voltage signal line; and in a touch sequence, the first switching signal line controls the first switch and the second switch to turn off to disconnect the first electrode connecting line and the second electrode connecting line and the common voltage signal line;

wherein the array substrate further comprises a data wiring layer having multiple parallel-arranged data lines; an extending direction of the second electrode is the same as that of the data line; and each of the second electrodes covers across the at least one data line; wherein the third layout area at least comprises a second switching signal line and multiple third switches; each of the data line is connected to the second electrode connecting line corresponding to the second electrode covering the data line through one of the third switches;

in the touch sequence, the second switching signal line controls the third switch to turn on to connect the data line to the second electrode connecting line; and in the display sequence, the second switching signal line controls the third switch to turn off to disconnect the data line and the second electrode connecting line.

2. The array substrate having the embedded touch structure according to claim 1, wherein the first switch and the second switch are thin film transistors, a gate of the first switch and a gate of the second switch are respectively connected to the first switching signal line, a source of the first switch and a source of the second switch are respectively connected to the common voltage signal line, a drain of the first switch is connected to the first electrode connecting line and a drain of the second switch is connected to the second electrode connecting line.

3. The array substrate having the embedded touch structure according to claim 1, wherein each of the first electrodes is elongated to a strip shape in the effective area and each of the second electrodes comprises multiple second sub-electrodes, wherein the second electrode connecting line corresponding to each of the second electrode sequentially connect the second sub-electrodes to each other.

4. The array substrate having the embedded touch structure according to claim 1, wherein the touch wiring layer is located above the data wiring layer relatively; an isolation layer is disposed between the touch wiring layer and the common electrode layer; and the first electrode connecting line and second electrode connecting line are respectively connected to the corresponding first electrode and corresponding second electrode through vias formed in the isolation layer.

5. The array substrate having the embedded touch structure according to claim 1, wherein the second switching signal line and the multiple third switches are further disposed in the first layout area; and in the first layout area, each of the data lines is connected to the second electrode connecting line corresponding to the second electrode covering the data line through one of the third switches.

6. The array substrate having the embedded touch structure according to claim 5, wherein in the first layout area, each of the first electrode connecting lines is connected to one of the data lines through one of the third switches.

7. The array substrate having the embedded touch structure according to claim 6, wherein the third switch is a thin film transistor; a gate of the third switch is connected to the second switching signal line; a source is connected to the data line; and a drain is connected to the corresponding first electrode connecting line or the corresponding second electrode connecting line.

8. The array substrate having the embedded touch structure according to claim 1, wherein the data wiring layer is located below the common electrode layer relatively and an isolation layer is disposed between the data wiring layer and the common electrode layer.

9. A display panel, comprising two oppositely-disposed array substrate and color film substrate and a liquid crystal layer filled between the array substrate and the color film substrate, wherein the array substrate is an array substrate having an embedded touch structure and the array substrate having the embedded touch structure comprises a common electrode layer and a touch wiring layer, wherein the common electrode layer is divided into multiple first electrodes and multiple second electrodes extending along directions perpendicular to each other and are isolated from each other; the touch wiring layer is disposed with multiple first electrode connecting lines and multiple second electrode connecting lines; and the array substrate comprises an effective display area and a first layout area, a second layout area, a third layout area and a fourth layout area surrounded outside the effective display area, wherein the first layout area has a driving integrated chip; the multiple first electrode connecting lines are extended from the first layout area to an area adjacent to the second layout area and the fourth layout area and connect the multiple first electrodes to the driving integrated chip one by one; the multiple second electrode connecting lines are extended from the first layout area, across the effective display area and toward the corresponding third layout area and connect the multiple second electrodes to the driving integrated chip one by one; and the multiple first electrodes and the multiple second electrodes time-sharing transmit a common voltage signal and a touch signal; wherein a common voltage signal line and a first switching signal line are disposed in the second layout area, the third layout area and the fourth layout area, wherein in the second layout area and the fourth layout area, each of the first electrode connecting lines is connected to the common voltage signal line through a first switch; and in the third layout area, each of the second electrode connecting lines is connected to the common voltage signal line through a second switch;

in a display sequence, the first switching signal line controls the first switch and the second switch to turn on to respectively connect the first electrode connecting line and the second electrode connecting line to the common voltage signal line; and in a touch sequence, the first switching signal line controls the first switch and the second switch to turn off to disconnect the first electrode connecting line and the second electrode connecting line and the common voltage signal line;

wherein the array substrate further comprises a data wiring layer having multiple parallel-arranged data lines; an extending direction of the second electrode is the same as that of the data line; and each of the second electrodes covers across the at least one data line; wherein the third layout area at least comprises a second switching signal line and multiple third switches; each of the data line is connected to the second electrode connecting line corresponding to the second electrode covering the data line through one of the third switches;

in the touch sequence, the second switching signal line controls the third switch to turn on to connect the data line to the second electrode connecting line; and in the display sequence, the second switching signal line controls the third switch to turn off to disconnect the data line and the second electrode connecting line.

10. The display panel according to claim 9, wherein the first switch and the second switch are thin film transistors, a gate of the first switch and a gate of the second switch are respectively connected to the first switching signal line, a source of the first switch and a source of the second switch are respectively connected to the common voltage signal line, a drain of the first switch is connected to the first electrode connecting line and a drain of the second switch is connected to the second electrode connecting line.

11. The display panel according to claim 9, wherein each of the first electrodes is elongated to a strip shape in the effective area and each of the second electrodes comprises multiple second sub-electrodes, wherein the second electrode connecting line corresponding to each of the second electrode sequentially connect the second sub-electrodes to each other.

12. The display panel according to claim 9, wherein the touch wiring layer is located above the data wiring layer relatively; an isolation layer is disposed between the touch wiring layer and the common electrode layer; and the first electrode connecting line and the second electrode connecting line are respectively connected to the corresponding first electrode and the corresponding second electrode through vias formed in the isolation layer.

13. The display panel according to claim 9, wherein the second switching signal line and the multiple third switches are further disposed in the first layout area; and in the first layout area, each of the data lines is connected to the second electrode connecting line corresponding to the second electrode covering the data line through one of the third switches.

14. The display panel according to claim 13, wherein in the first layout area, each of the first electrode connecting lines is connected to one of the data lines through one of the third switches.

15. The display panel according to claim 14, wherein the third switch is a thin film transistor; a gate of the third switch is connected to the second switching signal line; a source is connected to the data line; and a drain is connected to the corresponding first electrode connecting line or the corresponding second electrode connecting line.

16. The display panel according to claim 9, wherein the data wiring layer is located below the common electrode layer relatively and an isolation layer is disposed between the data wiring layer and the common electrode layer.

* * * * *